United States Patent
Rudell et al.

[19]

[11] Patent Number: 6,089,586
[45] Date of Patent: Jul. 18, 2000

[54] CONVERTIBLE SCOOTER/TRIKE

[75] Inventors: Elliot Rudell, 1619 Gramercy Ave., Torrance, Calif. 90501; Joseph Cemansky, Palos Verdes Estates; George Foster, Long Beach, both of Calif.

[73] Assignee: Elliot Rudell, Torrance, Calif.

[21] Appl. No.: 09/167,862

[22] Filed: Oct. 7, 1998

[51] Int. Cl.[7] ....................................................... B62K 9/02
[52] U.S. Cl. ..................................... 280/282; 280/87.041
[58] Field of Search ............................... 280/259, 87.041, 280/87.05, 87.021, 282, 62; 446/487, 465, 471, 78

[56] References Cited

U.S. PATENT DOCUMENTS

| | | | |
|---|---|---|---|
| 4,079,957 | 3/1978 | Blease | 280/278 |
| 4,621,826 | 11/1986 | Ziegler, Jr. | 280/259 |
| 4,657,270 | 4/1987 | Allen et al. | 280/7.1 |
| 4,865,337 | 9/1989 | Disler et al. | 280/7.1 |
| 4,958,842 | 9/1990 | Chang | 280/7.1 |

*Primary Examiner*—Brian L. Johnson
*Assistant Examiner*—J. Allen Shriver

[57] ABSTRACT

A children's ride-on toy convertible between tricycle and a scooter configurations includes a curved backbone having an upper end segment and a lower end segment defining an upwardly facing step area, rear wheels rotatably mounted to the lower end segment, a front fork including a head post rotatably mounted to the upper end segment and a front wheel rotatably mounted to the fork. The toy also has a rigid frame member with first and second ends and a seat area between those ends, the first end being connected by a two-axis pivot joint to the head post, This allows the frame member to be moved between a first, tricycle, position wherein the frame member extends over the backbone away from the head post such that the seat area faces upwardly away from the backbone and a second, scooter, position wherein the frame member extends up in front of the head post to a location spaced above the backbone thereby exposing the step area. Provision is made for releasably retaining the frame member in its two operative positions and the same handlebars are used in both configurations.

10 Claims, 3 Drawing Sheets

CONVERTIBLE SCOOTER/TRIKE

This invention relates to children's ride-on toys. It relates more particularly to a single such toy which can be converted between a tricycle and a scooter.

BACKGROUND OF THE INVENTION

Children's ride-on toys are usually designed for a single purpose or mode of use. A tricycle, for example invariably has a rigid backbone or frame with a seat, a steerable front wheel and two fixed rear wheels. A child sitting on the seat propels the tricycle by turning a crank shaft with pedals attached to the front wheel and steers the toy using handlebars attached to head post. A scooter, on the other hand, has a frame with front and rear wheels, the former of which is steerable by rotating an upstanding steering post topped off by handlebars. However, that toy has no seat. Rather, the child stands on a step area of the frame with one foot and propels the scooter with the other, steering the toy by turning the handlebars.

As a result of their separate modes of propulsion, tricycles and scooters invariably constitute separate articles of manufacture which must be purchased separately in order for a child to enjoy the benefits of both toys. Not only must the child's parents pay the cost of two toys, but also space must be provided for storing the two toys which can pose a problem for those living in small apartments and other homes where space is at a premium.

SUMMARY OF THE INVENTION

The present invention addresses the above problems by providing a single ride-on toy which can be used by small children either as a tricycle or a scooter. In other words, the toy can be converted or transformed between a tricycle having a frame with a seat that can be propelled using pedal power provided by a child sitting on a seat and a scooter having a frame on which a child can stand with one foot while propelling the toy with the other foot. Furthermore, the conversion from one type of toy to the other can be accomplished with minimum effort using no tools at all.

The ability to convert or transform the single toy from one mode of operation to the other is due in large part to the toy's special frame design to be described in detail later. Suffice it to say at this point that the frame includes a rigid backbone which sweeps down from an elevated front end segment adjacent to the head post of a front fork supporting the toy's front wheel to a lower rear end segment above the vehicle's rear wheels and which defines a step area, and a rigid frame member which defines a seat area and is connected by a two-axis pivot joint to the head post. That pivot joint enables the frame member to be moved between a lower, tricycle position wherein the frame member extends over the backbone away from the head post so that the seat area faces upward away from the backbone and an upright, scooter position wherein the frame member extends up in front of the head post to a location spaced above the backbone such that the foot rest is exposed. As will be seen, means are provided for releasably retaining the frame member in its two operative positions and the same handle bars are used in both configurations.

BRIEF DESCRIPTION OF THE DRAWINGS

For a fuller understanding of the nature and objects of the invention, reference should be had to the following detailed description taken in connection with the accompanying drawings, in which.

DETAILED DESCRIPTION OF AN ILLUSTRATIVE EMBODIMENT

Figure 1:
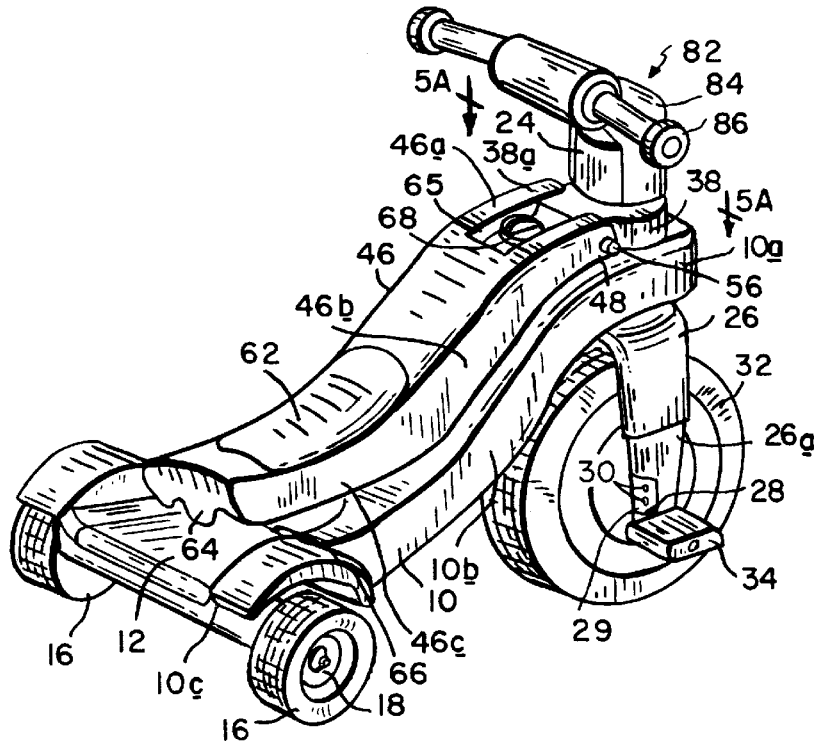
FIG. 1 is a perspective view of a children's ride-on toy incorporating the invention, the toy being shown in its tricycle configuration.
Figure 3:
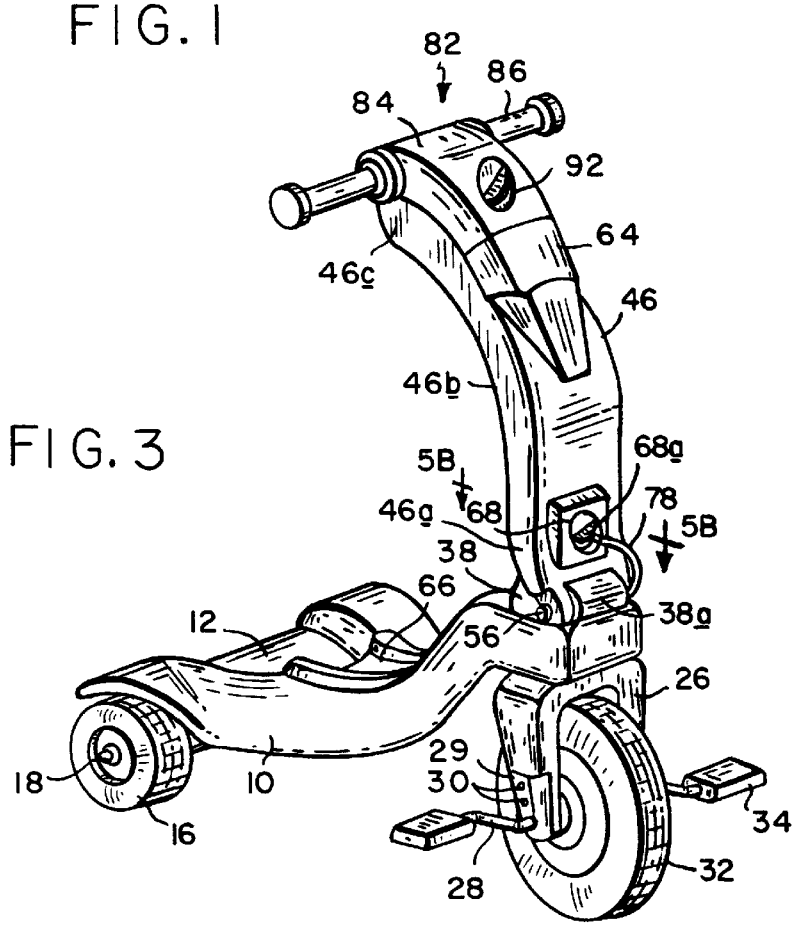
FIG. 3 is a view similar to FIG. 1 illustrating the toy in its scooter configuration.

FIGS. 1 and 3 show a single children's ride-on toy which is convertible or transformable between a tricycle configuration (FIG. 1) and a scooter configuration (FIG. 3). The toy is comprised of a relatively few components most of which are molded plastic parts which are easy to assemble by the purchaser without any special tools or other equipment. As shown in those figures, the toy comprises a frame or backbone 10 having an upper, generally horizontal forward end segment 10a, a downwardly curved mid-segment 10b and a lower rear end segment 10c which defines a generally horizontal step area or platform 12. Backbone 10 flares laterally so that the rear end segment 10c thereof (and area 12) is substantially wider than the forward end segment 10a thereof. A rigid metal rod or axle 14 (FIG. 2) extends laterally through suitable aligned holes (not shown) in frame segment 10c and a pair of relatively small diameter rear wheels 16 are rotatably mounted to the opposite ends of axle 14 and secured there by push caps 18 press-fit onto the opposite ends of axle 14.

Figure 2:
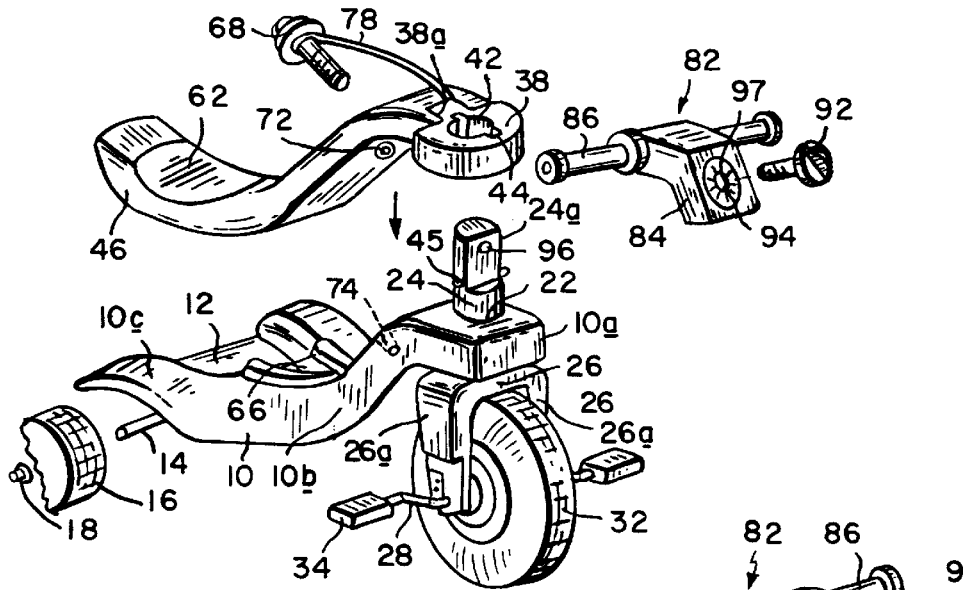
FIG. 2 is an exploded perspective view showing certain elements of the FIG. 1 toy in greater detail.
Figure 4:
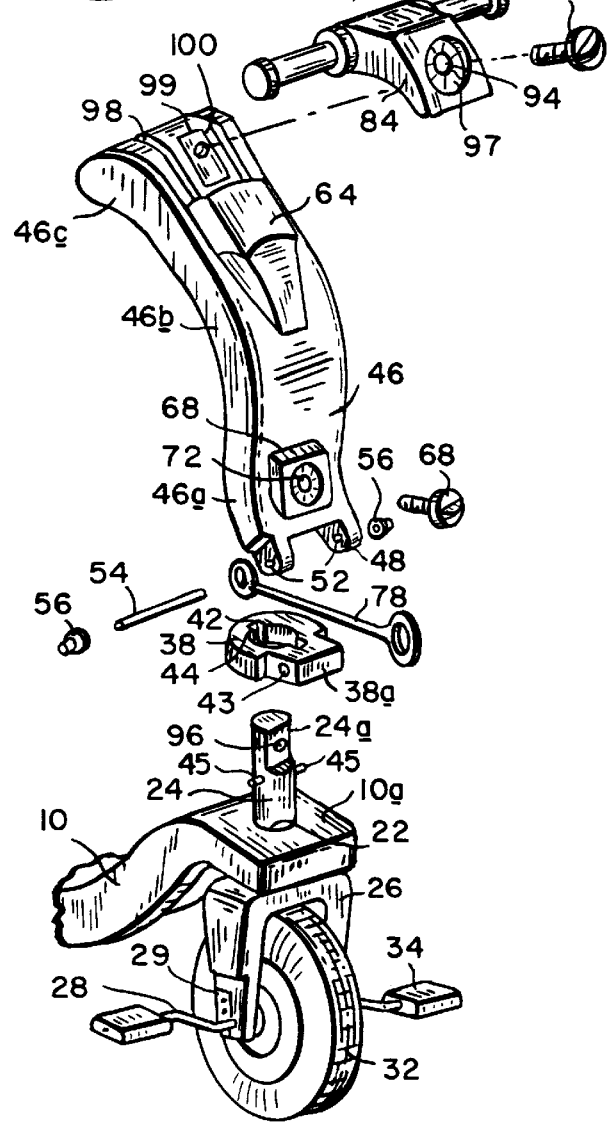
FIG. 4 is a view similar to FIG. 2 also showing elements of the toy in greater detail.

As best seen in FIGS. 2 and 4, the forward end segment 10a of frame 10 is formed with a relatively large diameter vertical through-hole 22 which is adapted to rotatably receive the head post 24 of a front fork 26. Fork 26 has legs or tines 26a which extend down below frame end segment 10a and rotatably support a pedal crank 28 fixed to a relatively large diameter front wheel 32. The pedal crank 28 is rotatably secured to each tine 26a by a bracket 29 fixed to the associated tine by fasteners 30 (FIGS. 1 and 3). Wheel 32 is rotated by foot power applied to pedals 34 rotatably mounted to the opposite ends of the pedal crank. The front wheel 32 may be turned for steering purposes by rotating the head post 24 in one direction or the other.

Figure 5A:
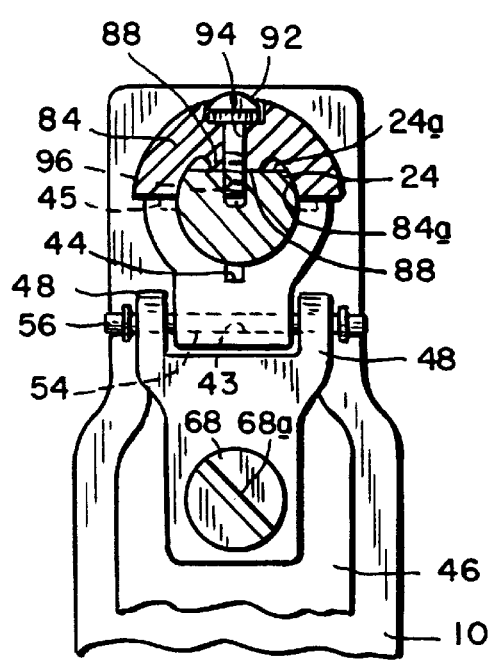
FIGS. 5A and 5B are fragmentary sectional views on a larger scale showing the frame of the FIGS. 1 and 3 toy taken along lines 5A—5A and 5B—5B, respectively.
Figure 5B:
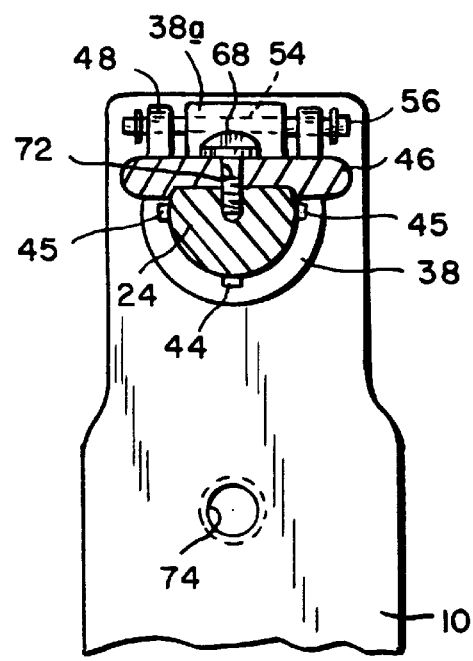

As shown in FIGS. 1, 4, and 5B), a collar 38 having a central opening 42 is rotatably engaged on the head post 24 above frame segment 10a. Collar 38 is provided with an extension 38a having a lateral passage 43 therethrough as shown in FIG. 4. Preferably, vertical slots 44 are provided in the wall of collar opening 42 to provide clearance for a pair of pins 45 projecting out from opposite sides of head post 24. When collar 38 is oriented so that the slots 44 therein are aligned with pins 45, the collar may be slid onto the head post so as to engage against the top of backbone end segment 10a. Then, when the collar is turned so that the slots and pins are offset as shown in FIGS. 1 and 3, the collar (and frame segment) are rotatably secured to the head post thereby allowing the front fork 26 to be turned for steering purposes.

As best seen in FIGS. 1, 2 and 4, the toy also includes an upper frame member 46 having a forward end segment 46a, a curved middle segment 46b and a rear end segment 46c. A pair of spaced apart ears 48 project from the forward end segment 46a. These ears are provided with a pair of collinear holes 52 which, when member 46 is positioned so that ears 48 bracket the collar extension 38a, are aligned with the opposite ends of passage 43 in extension 38a. As shown in FIGS. 4 and 5A, member 46 is pivotally secured to collar 38 by a rigid pin 54 (FIG. 4) which extends through holes 48 and passage 43. The pin may be held in place by push caps 56 pressed onto the projecting opposite ends of the pin.

As best seen in FIGS. 1, 2 and 5A, the aforesaid pivotal connection of frame member 46 to collar 38 which can, in turn, pivot about head post 24 forms a two-axis pivot joint between member 46 and head post 24 which allows frame member 46 to assume its lower tricycle position shown in FIG. 1 in which the collar extension 38a faces rearwardly. Frame member 46 is shaped so that the middle segment 46b thereof follows the curvature of the backbone segment 10b while the rear end segment 46c of member 46 forms an upwardly facing generally horizontal seat area 62.

As shown in FIGS. 1, 2 and 4, the surface of frame member segment 46c opposite seat 62 is formed with a large protrusion or boss 64 which seats in a recess 66 present on the upper surface of backbone mid-segment 10b when frame member 46 is in its FIG. 1 tricycle position. This prevents that frame member from moving from side to side.

In order to releasably retain the frame member 46 in its FIG. 1 tricycle position, a large headed screw 68 is provided which is adapted to be passed down through a recessed hole 72 in frame member end segment 46a and turned down into a threaded hole 74 (FIG. 5B) in backbone segment 10b. Preferably, the head of screw 68 is provided with a prominent rib 68a to facilitate turning the screw. Some resistance to such turning may be provided by interfitting radial ribs at the underside of the screw head and around the recessed hole 72 in frame member 46; see FIG. 4. To prevent the screw 68 from becoming separated from the remainder of the toy and being lost, the screw may be provided with a tether 78, shown in FIG. 4, which connects screw 68 to the pin 54 that attaches the frame member 46 to collar 38.

Referring now to FIGS. 1, 2 and 5A, the subject toy also includes a handlebar member shown generally at 82 to facilitate steering the toy in both of its operative configurations. Member 82 includes a main body 84 with a pair of handlebars 86 extending laterally in opposite directions from body 84. The rear surface 84a of body 84 is cylindrically recessed to fit around the head post 24. Also, a flat boss 88 is provided at that rear surface 84a which seats against a flat 24a provided at the upper end segment of head post 24 above collar 38 to inhibit relative rotational movement of the handlebar member and head post. The handlebar member 82 may be releasably secured to the head post by means of a large screw 92 similar to screw 68 which may be inserted through a recessed hole 94 in the handlebar member body 84 and turned down into a threaded hole 96 in head post 24 at the flat thereon. As with screw 68, the underside of the head of screw 94 may be provided with ribs (not shown) which interfit with ribs 97 (FIG. 2) around the recessed hole 94 so that once the screw 92 is tightened down, it takes an appreciable amount of torque to loosen the screw. If desired, the screw 92 may be tethered to handlebar member 42 by a tether similar to the tether 78 in FIG. 4.

When the illustrated toy is in its tricycle configuration illustrated in FIG. 1, a child sitting on seat 62 can propel the toy in the desired direction with ease by applying foot power to the pedals 34 and turning the handlebar member 82 using his/her hands.

In order to convert the tricycle shown in FIG. 1 to the scooter illustrated in FIG. 3, one only has to unscrew the two screws 68 and 92. This allows the handlebar member 82 to be separated from head post 24 and allows frame member 46 to be swung up to a more or less vertical position and pivoted about the head post 24 on collar 38 so that the frame member extends up in front of that post as shown in FIGS. 3 and 5B. This positions the hole 72 in frame member end segment 46a opposite the head post flat 24a in alignment with the threaded hole 96 therein as shown in FIGS. 3 and 5A. The screw 68 can now be inserted through hole 72 and turned down into the threaded hole 96 in the head post to secure the frame member 46 in its upright scooter position shown in FIG. 3.

At this point, the handle bar member 82 may be releasably attached to the free end segment 46c of frame member 46 using screw 92. More particularly, as shown in FIGS. 3 and 4, a surface portion 98 of frame member segment 46c adjacent the protrusion or boss 64 thereon is shaped to mate with the recessed surface 84a of the handlebar member body 84. That portion is also provided with a recessed area 99 for receiving the handlebar member boss 88 to locate the position of the handlebar member relative to frame member 46. The handlebar member is fastened to the free end of the frame member by inserting screw 92 through the hole 94 in that member and tightening the screw into a threaded hole 100 provided in the floor of recess 99.

As is evident from FIG. 3, when the toy is in its scooter configuration, a child can place one foot on the step area or platform 12 at the rear of backbone 10 and propel the toy by pushing the other foot against the ground, while steering the toy by turning the handlebar member 84.

The transformation of the toy back to its tricycle configuration may be accomplished by reversing the above steps.

Thus, the single toy described herein can be converted or transformed between the illustrated tricycle and scooter configurations by removing only two large screws which can be turned by hand and manipulating two parts, namely frame member 46 and the handle bar member 84. Therefore, the toy obviates the need to purchase and store both a tricycle and scooter.

All of the main components of the toy may be molded plastic parts which can be made in quantity relatively inexpensively. Furthermore, the toy can be sold in a knockdown condition and assembled easily by the purchaser using only a few simple tools. Therefore, it should find wide acceptance in the marketplace.

It will thus be seen that the objects set forth above, among those made apparent from the preceding description, are efficiently attained. Also, certain changes may be made in the above construction without departing from the scope of the invention. For example, the toy may have only one rear wheel making it a convertible scooter/bicycle. Therefore, it is intended that all matter contained in the above description or shown in the accompanying drawings shall be interpreted as illustrative and not in a limiting sense.

It will also be understood that the following claims are intended to cover all of the generic and specific features of the invention described herein.

What is claimed is:

1. A children's ride-on toy comprising:

a rigid backbone having a first end segment and a second end segment defining an upwardly facing step area;

at least one wheel rotatably mounted to said second end segment;

a front fork including a head post rotatably mounted to the first end segment of the backbone;

at least one wheel rotatably mounted to the fork;

a rigid frame member having first and second ends and a seat area between said ends;

a two-axis pivot joint connecting said first end of the frame member to the head post so that the frame member may be moved between a first position wherein the frame member extends over the backbone away from the head post such that the seat area faces away from the backbone and a second position wherein the frame member extends up on top of the head post to a location spaced vertical to the backbone such that the step area is exposed, and retaining means for releasably retaining said frame member in its said positions.

2. The toy defined in claim 1 wherein the toy has a rear wheel at each side of the backbone.

3. The toy defined in claim 1 wherein said joint comprises:

a collar encircling the head post, and a pivotal connection connecting the collar and the first end of the frame member which allows the frame member to pivot about an axis that is perpendicular to the head post.

4. The toy defined in claim 1 wherein the backbone and frame member are curved in conformity.

5. The toy defined in claim 1 wherein the retaining means comprise a fastener for releasably securing the frame member to the backbone when the frame member is in said first position and to the head post when the frame member is in said second position.

6. The toy defined in claim 5 and further including:

a handle bar member, and a second fastener releasably securing said handle bar member to the head post when the frame member is in said first position and to the frame member when the frame member is in said second position.

7. The toy defined in claim 6 and further including means for tethering at least one of said fasteners to the toy.

8. The toy defined in claim 1 wherein said backbone and frame member have coacting surface areas which inhibit lateral movement of the frame member when said member is in its said first position.

9. A children's ride-on toy comprising:

a backbone having two ends;

a wheel rotatably mounted to a first end of the backbone;

a front fork including a head post rotatably mounted to a second end of the backbone;

a wheel rotatably mounted to the fork;

a frame member having first and second ends;

a swivel joint connecting said first end of the frame member to the head post so that the frame member may be moved between a first position wherein the frame member extends over the backbone away from the head post and a second position wherein the frame member extends away from the backbone more or less parallel to the head post;

means for releasably securing the frame member to the backbone when the frame member is in said first position, and means for releasably securing the frame member to said head post when the frame member is in said second position.

10. The toy defined in claim 9 and further including:

a handlebar member, and means for releasably securing the handlebar member to said second end of the frame member when the frame member is in said second position.

* * * * *

UNITED STATES PATENT AND TRADEMARK OFFICE
CERTIFICATE OF CORRECTION

PATENT NO.    : 6,089,586  
DATED         : July 18, 2000  
INVENTOR(S)   : Elliot Rudell et al.

Page 1 of 1

It is certified that error appears in the above-identified patent and that said Letters Patent is hereby corrected as shown below:

<u>Title page,</u>  
Inventors, please replace "Cemansky" with -- Cernansky --.

Signed and Sealed this

Nineteenth Day of March, 2002

Attest:

JAMES E. ROGAN  
*Attesting Officer*   *Director of the United States Patent and Trademark Office*